(12) United States Patent
Ohtsuka

(10) Patent No.: US 6,186,924 B1
(45) Date of Patent: Feb. 13, 2001

(54) AUTOMATIC TRANSMISSION CONTROLLER

(75) Inventor: Toshio Ohtsuka, Hyogo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/390,469

(22) Filed: Sep. 3, 1999

(30) Foreign Application Priority Data

Mar. 10, 1999 (JP) .................................................. 11-064090

(51) Int. Cl.$^7$ .................................................. E16H 61/06
(52) U.S. Cl. .................................................. 477/155; 701/66
(58) Field of Search .................................. 477/138, 155; 701/66

(56) References Cited

U.S. PATENT DOCUMENTS

| | | | |
|---|---|---|---|
| 4,518,068 | * 5/1985 | Oguma et al. ........................ | 477/86 |
| 5,042,328 | * 8/1991 | Morishige et al. .................... | 477/98 |
| 5,133,231 | * 7/1992 | Goto et al. .......................... | 477/143 |

FOREIGN PATENT DOCUMENTS 5-35293    5/1993    (JP) .

\* cited by examiner

*Primary Examiner*—Sherry Estremsky
(74) *Attorney, Agent, or Firm*—Sughrue, Mion, Zinn, Macpeak & Seas, PLLC

(57) ABSTRACT

To minimize a delay time of the start of the control of a solenoid valve for changing gear ratios of a transmission, the need for a speed change is judged and when the speed change is needed, a control cycle of the solenoid valve is made longer than the control cycle in the steady state.

2 Claims, 5 Drawing Sheets

PRIOR ART
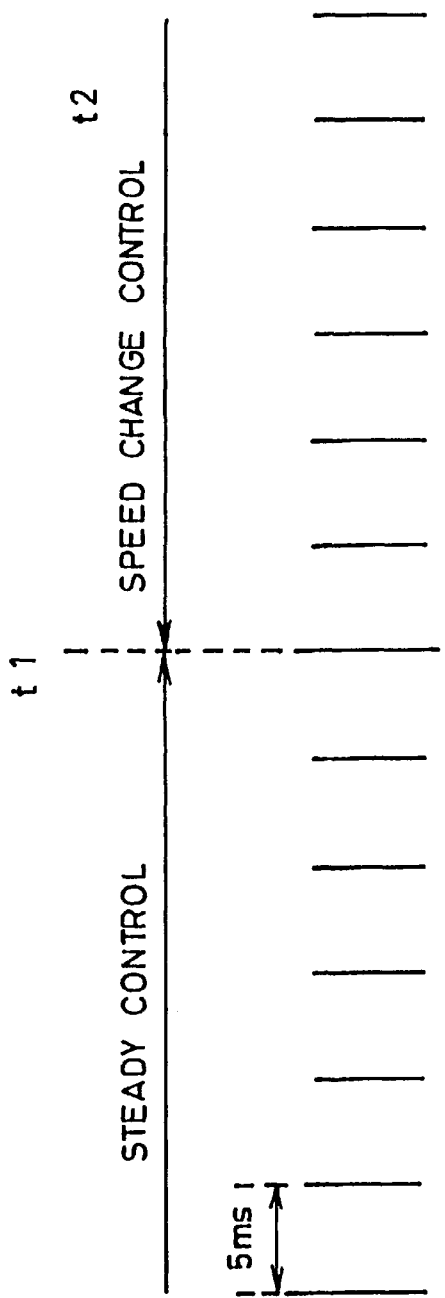
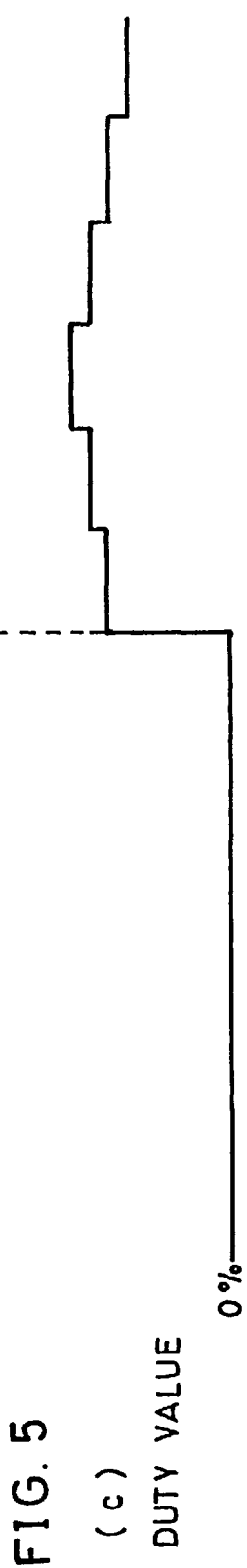
FIG. 5 (a) PROGRAM MAIN PROCESS
FIG. 5 (b) DUTY SOLENOID CONTROL PROCESS
FIG. 5 (c) DUTY VALUE

AUTOMATIC TRANSMISSION CONTROLLER

BACKGROUND OF THE INVENTION

1. Field of the Invention

The present invention relates to an automatic transmission controller and more particularly to the control of a solenoid valve that is used for changing gear ratios of an automatic transmission.

2. Description of the Prior Art

So far, a control method of a solenoid valve that is used for control of an automatic transmission is disclosed in the Japanese Patent Publication No. Hei 05-035293. In this solenoid valve control method, to make the program structure simple, control cycles in the steady state and the speed changing state were set at fixed times.

FIG. 5 (a), (b) and (c) are time charts showing the operations of the above-mentioned conventional transmission controller. The solenoid valve control cycle cannot be made shorter than a certain time from the viewpoint of hydraulic pressure response and to avoid a natural frequency of a vehicle body. So, the control cycle is set at 28.57 ms as illustrated. In contrast to this, in the main routine which computes controlled variables, the solenoid valve is controlled as fast as possible, for instance, at a control cycle of 5 ms as shown in the example in FIG. 5 to improve manpower taking accuracy and control accuracy of a throttle opening sensor, etc., that is, to get new information precisely.

In the above-mentioned automatic transmission control method, the solenoid valve is controlled at an interval of fixed cycle time in the steady state as well as the speed change state and therefore, there was such a problem that the speed change control was delayed to start by maximum one control cycle when changing the steady state to the speed change state. In other words, even when the speed change is judged as required in the program main process, the duty solenoid control started at a time t2 as the next duty solenoid control process is set at the time t2. Therefore, the control is delayed by maximum one cycle.

SUMMARY OF THE INVENTION

The present invention is made to solve the above-mentioned problems and make the control delay short when changing the transmission from the steady state to the speed changing state and improve accuracy of the oil pressure control during the speed change while suppressing fluctuation of the delaying time.

In order to achieve the above object, in a first invention, the above-mentioned solenoid valve control cycle is set at a longer time than that in the steady state by a switching means when a judging means judged that the speed change is required.

Further, in a second invention it is judged that the speed change is not required when the solenoid valve control duty is 0% and the speed change is required when the control duty is other than 0%.

The above and other objects, features and advantages of the present invention will become more apparent from the following description when taken in conjunction with the accompanying drawings.

BRIEF DESCRIPTION OF THE DRAWINGS

FIG. 5 is a timing chart showing the control timing of a conventional automatic transmission controller.

DESCRIPTION OF THE PREFERRED EMBODIMENT

A preferred embodiment of the present invention is described below with reference to the attached drawings.

Figure 1:
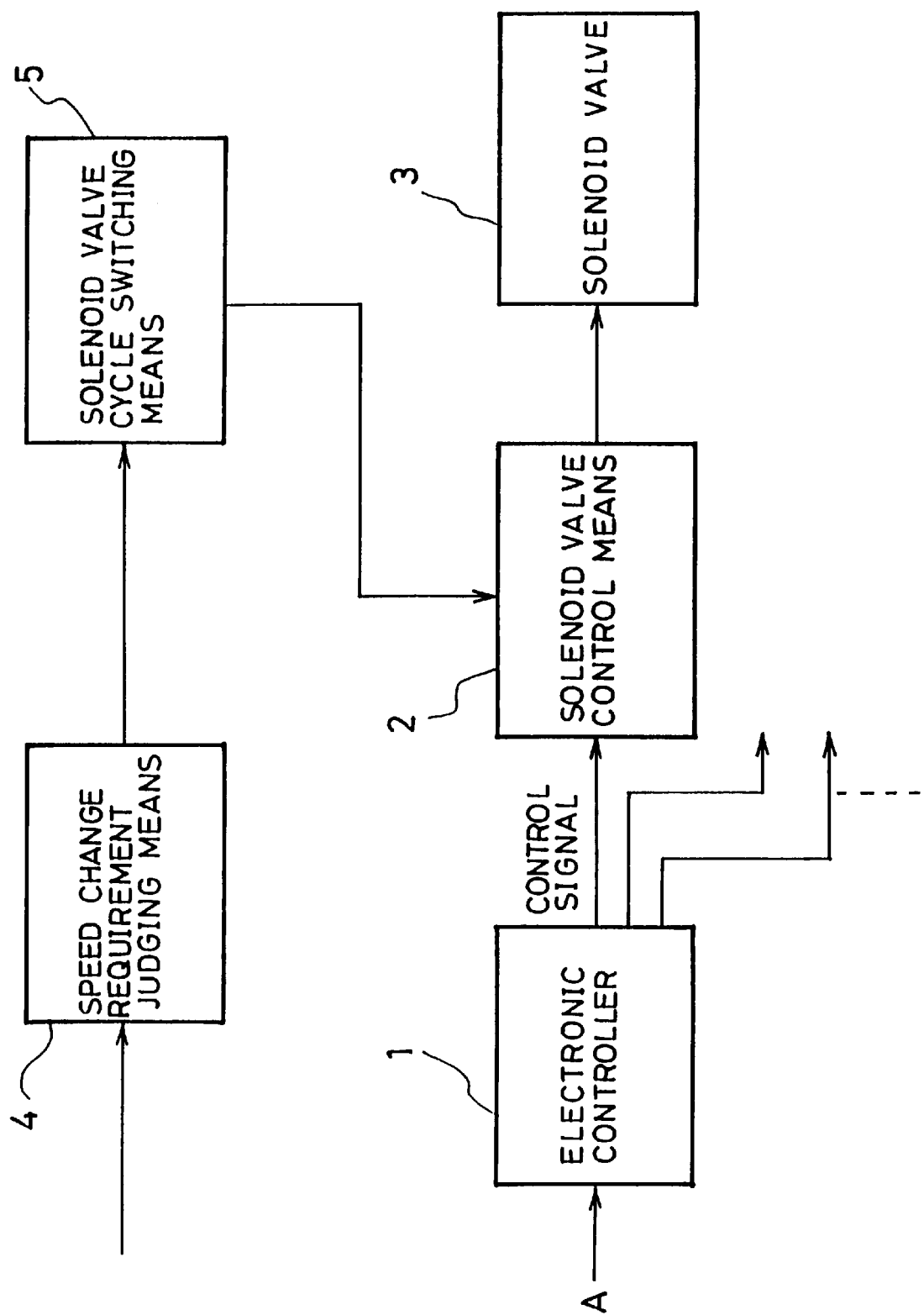
FIG. 1 is a block diagram showing one example of an automatic transmission controller of the present invention.
Figure 2:
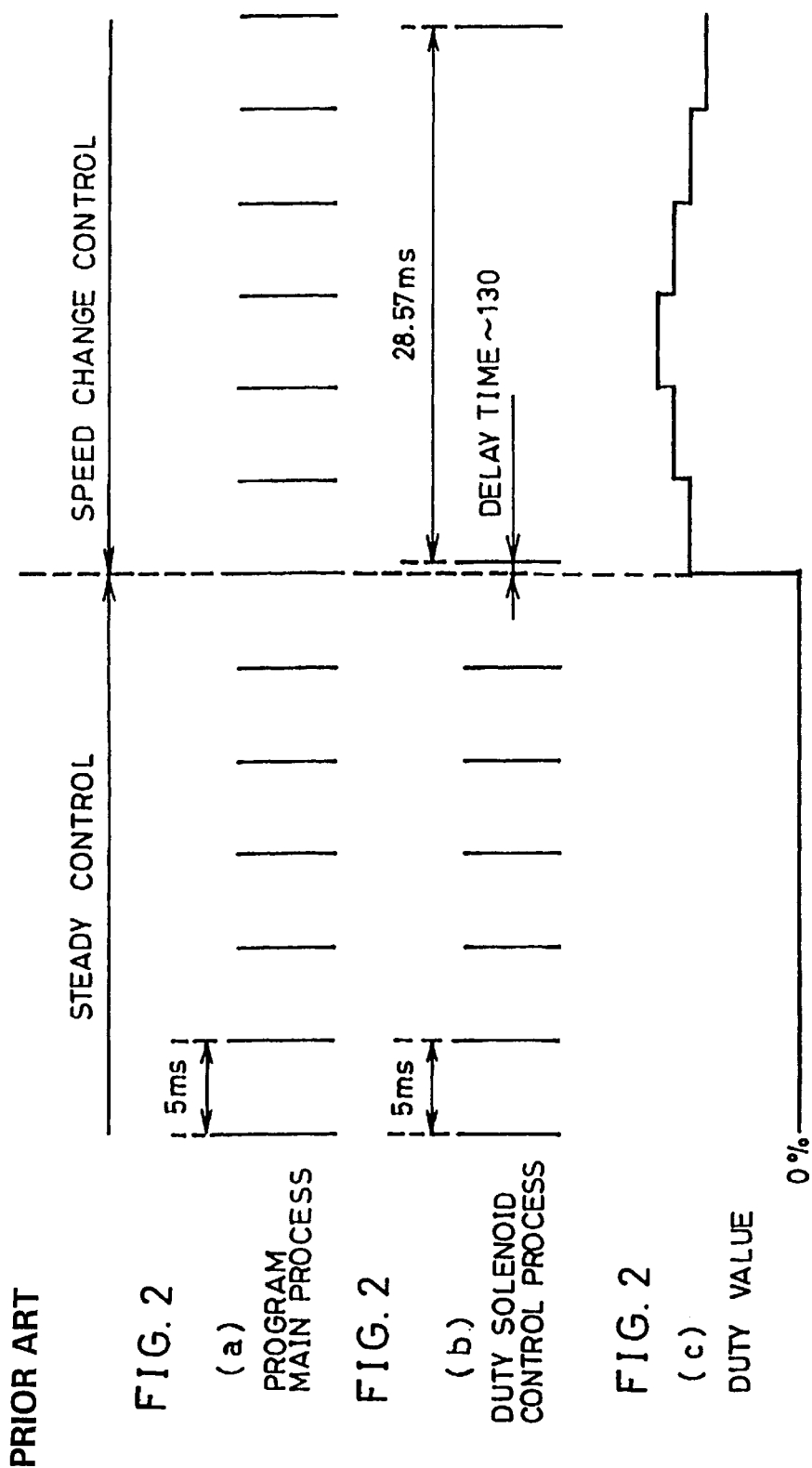
FIG. 2 is a timing chart showing the control timing of the automatic transmission controller of the present invention.

FIG. 1 is a functional block diagram of the automatic transmission controller and FIG. 2 is a timing chart showing the control timing. In FIG. 1, 1 is an electronic controller, 2 is a solenoid valve control means, 3 is a solenoid valve, 4 is a speed change requirement judging means and 5 is a solenoid valve control cycle selector means.

The electronic controller 1 controls the solenoid valve control means 2 and in addition, outputs a control signal for controlling various equipment of a vehicle. That is, the electronic controller 1 outputs a control signal according to an input factor A such as an engine throttle valve opening, negative pressure of an intake manifold, engine speed, kick down drum revolving speed, oil temperature, select lever position, various auxiliary switch positions, etc. The solenoid valve control means 2 controls the duty of the solenoid valve 3 that is provided in the hydraulic control system of the transmission according to the control signal from the electronic controller 1.

The speed change requirement judging means 4 judges whether the speed change is needed for a vehicle according to a method described later and based on this judgement, the solenoid valve control cycle selector means 5 controls the solenoid valve control means 2, which in turn resets the control cycle of the solenoid valve 3 from a short control cycle of the steady state to a long control cycle of the speed change state.

Further, the speed change requirement judging means 4 and the solenoid valve cycle selector means may be incorporated in the solenoid valve control means 2 so as to partially compose the functions of the solenoid valve control means 2. The functions of the speed change requirement judging means 4, the solenoid valve cycle selector means 5 or the solenoid valve control means 2 are normally materialized by a software but needless to say, they may be constructed in a hardware. Accordingly, the present invention is not necessarily restricted to the structure shown in FIG. 1 and various structures are considered.

In FIG. 2, the program main process is executed at an interval of every 5 ms and it is judged whether a vehicle is currently running in the steady controlled state or the speed changed state. In addition, during this program main process, the solenoid valve control duty is computed and the 0% duty in the steady controlled state is changed to the duty corresponding to the vehicle running state in the speed changed controlled state.

In the duty solenoid valve control process, when the duty is 0% or no speed change is required, the control cycle is controlled to 5 ms and when the duty is other than 0% or the speed change is required, the control cycle is controlled to 28.57 ms. The requirement for speed change is judged according to whether the duty is 0% or other than 0% and the control cycle is controlled according to the result of this judgement. Here, the basis of the control cycle 5 ms is as follows. That is, because the input process, speed change judgement, decision of an indicated duty value during the speed change, etc. are made by the main routine at an interval of 5 ms cycle in the solenoid valve control program, the control cycle is set at 5 ms. The control cycle of 0 ms is best because a delay time as short as possible is preferred. A program structure which changes the duty control cycle by calling an interruption when it is judged to start the speed change in the main program is not practical at present and therefore, a duty output interruption process completely independent from a main routine makes the control at the cycle time of 5 ms.

Further, the basis of the control cycle 28.57 ms is as follows. The vehicle body resonance frequency exists in a range 5~10 Hz. The effective use range of the duty solenoid valve is below 100 Hz. 35 Hz (28.57 ms) is decided as a frequency satisfying these two conditions. Therefore, the frequency range becomes above 10 Hz and below 100 Hz.

Further, in this embodiment, the solenoid valve control cycle is controlled according to a program that is pre-programmed, that is, according to software.

Figure 3:
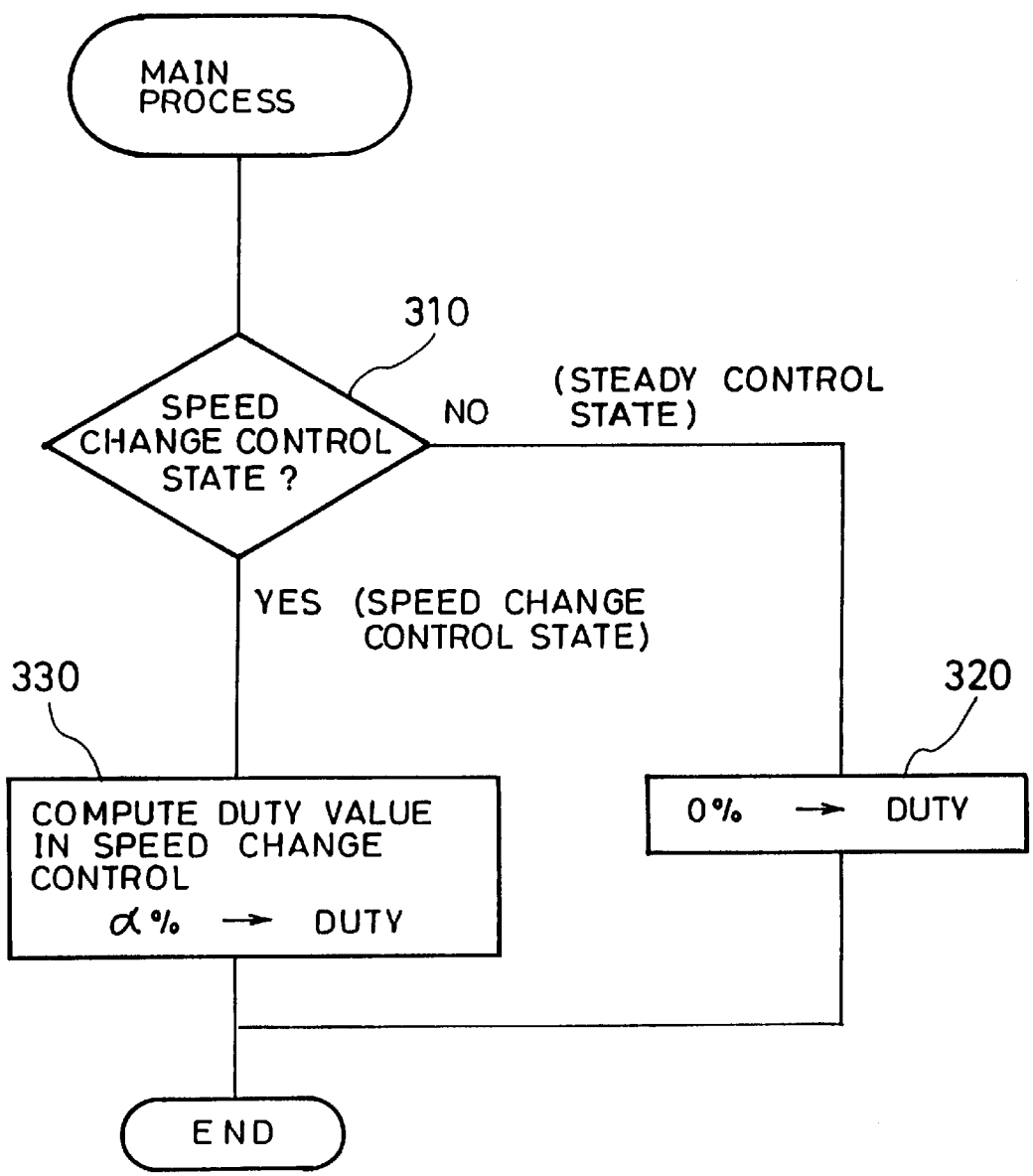
FIG. 3 is a flowchart showing the program main process of the automatic transmission controller.

FIG. 3 is a flowchart showing the control main process of the automatic transmission controller. This main process is executed at an interval of every 5 ms.

In FIG. 3, in the process routine, whether the speed change is needed or the transmission is in the steady state or in the speed change controlled state is first judged (Step 310). In case of the speed change control state, a duty value α% corresponding to the speed change control state is computed (Step 330). In case of the steady state, the duty value is set at 0% (Step 320). The state of 0% duty value denotes the state wherein the speed change is maintained by supplying maximum oil pressure to such engaging elements as the clutch, brakes, etc.

Figure 4:
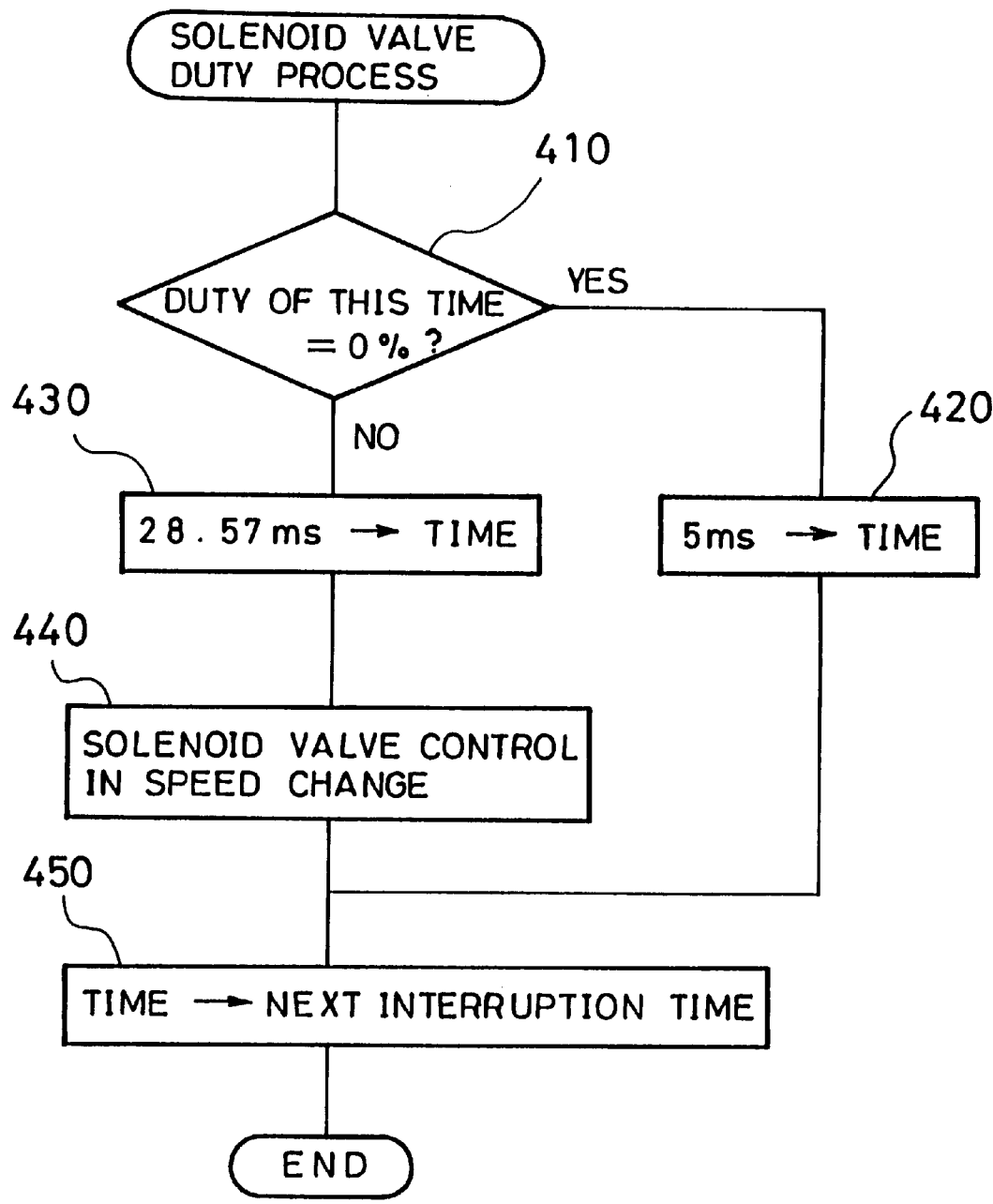
FIG. 4 is a flowchart showing the solenoid valve duty process of the automatic transmission controller.

FIG. 4 is a flowchart showing the solenoid valve duty process of the automatic transmission controller. This solenoid valve duty process flowchart is started up when the ignition is turned ON and thereafter, the valve is controlled at a control cycle that is set in Step 420 or 430 that are described later.

In FIG. 4, in the process routine, it is first judged if the duty value computed this time in the main process is 0% (Step 410). If the duty value is 0%, an interruption time is set at 5 ms (Step 420). If the duty value is other than 0%, the solenoid valve control cycle is set at 28.57 ms (Step 430) and the solenoid valve is controlled based on this control cycle and an interruption time during this speed change control is computed (Step 440) and the computed interruption time is set (Step 450).

Thus, when the steady controlled state changes to the speed controlled state, the oil pressure delay time at the time when starting the speed change control can be minimized by changing the solenoid valve control cycle from the short cycle of the steady state to the long cycle. In other words, a delay time of oil pressure supply is minimized by minimizing the delay of the duty control starting when the steady state is changed to the speed change state by making the control cycle during the steady controlled state. Further, the solenoid valve control cycle during the speed change control is the same as before and therefore, the control cycle is not affected by oil pressure characteristic.

Further, although the need of speed change is judged according to whether the duty is 0% or other than 0% in this embodiment, other methods shown below can be considered for judging the need of speed change.

(1) When the throttle opening and a car speed cross the shift line.

(2) When the P.N range is changed to other ranges (N-D shift, N-R shift).

(3) When the D range is changed to the 2 range or L range.

Further, when the O/D SW is turned ON/OFF (the manual shift).

Anyone of the above (1)~(3) can be used for judging that the speed change is needed and when the speed change is judged to be not required by this judgement, the control duty is decided to be (Duty=0%) and when judged to be required, the duty is assumed to be (Duty≠0%) and the control of oil pressure during the speed change starts.

As described above, according to a first invention, the solenoid valve control cycle is set at a long cycle when the steady control state is changed to the speed change control state and it is therefore possible to make a solenoid valve control start delay time short and the time fluctuation small, and increase oil pressure control accuracy at the speed change.

Further, according to a second invention, when judging the speed change, if a control duty of the solenoid valve is 0%, it is judged that the speed change is not needed and if other than 0%, it is judged that the speed change is needed and therefore, the need of the speed change of a vehicle can be judged relatively accurately.

What is claimed is:

1. An automatic transmission controller comprising:

judging means to judge a speed change requirement for speed change of a vehicle; and switching means to switch a control cycle of a solenoid valve of a transmission;

characterized in that when the judging means judges that the speed change is required, the switching means sets a control cycle of the solenoid valve to a value longer than the control cycle of a steady state.

2. An automatic transmission controller according to claim 1, wherein the judging means judges that the speed change is not needed when the solenoid valve control duty is 0% and judges that the speed change is needed when the solenoid valve control duty is other than 0%.

* * * * *